United States Patent
Boden et al.

(10) Patent No.: US 8,442,056 B2
(45) Date of Patent: May 14, 2013

(54) SCHEDULING PACKETS IN A PACKET-PROCESSING PIPELINE

(75) Inventors: Kurt Thomas Boden, Strangnas (SE); Jakob Carlstrom, Uppsala (SE)

(73) Assignee: Marvell International Ltd., Hamilton (BM)

( * ) Notice: Subject to any disclaimer, the term of this patent is extended or adjusted under 35 U.S.C. 154(b) by 156 days.

(21) Appl. No.: 13/170,427

(22) Filed: Jun. 28, 2011

(65) Prior Publication Data

US 2013/0003556 A1    Jan. 3, 2013

(51) Int. Cl.
*H04L 12/56* (2006.01)

(52) U.S. Cl.
USPC .................................. 370/395.4; 370/389

(58) Field of Classification Search ............. 370/389, 370/395.4, 359, 376, 386, 401, 402
See application file for complete search history.

(56) References Cited

U.S. PATENT DOCUMENTS

| | | | |
|---|---|---|---|
| 7,167,485 B2 * | 1/2007 | Hrabik et al. | 370/461 |
| 2005/0058137 A1 * | 3/2005 | Carlson et al. | 370/395.4 |
| 2008/0209186 A1 | 8/2008 | Boden | |
| 2009/0183164 A1 | 7/2009 | Carlstrom | |

* cited by examiner

*Primary Examiner* — Brenda H Pham

(57) ABSTRACT

The disclosed embodiments relate to a packet-processing system. This system includes an input which is configured to receive packets, wherein the packets include control-message (CM) packets and traffic packets. It also includes a pipeline to process the packets, wherein the pipeline includes access points for accessing an engine which services requests for packets, wherein CM packets and traffic packets access the engine through different access points. The system additionally includes an arbiter to schedule packets entering the pipeline. While scheduling the packets, the arbiter is configured to account for empty slots in the pipeline to ensure that when CM packets and traffic packets initiate accesses to the engine through different access points, the accesses do not cause an overflow at an input queue for the engine.

24 Claims, 4 Drawing Sheets

SCHEDULING PACKETS IN A PACKET-PROCESSING PIPELINE

BACKGROUND

1. Field

The disclosed embodiments generally relate to packet-processing systems for communications networks. More specifically, the disclosed embodiments relate to a method and an apparatus for scheduling both control message packets and traffic packets in a packet-processing pipeline.

2. Related Art

Network processors often include a programmable pipeline to facilitate processing a stream of packets at high data rates, for example up to 100 gigabits per second. A programmable pipeline is often associated with one or more "processing engines" that perform various packet-processing operations, such as accessing a lookup table. Moreover, a programmable pipeline typically interacts with an engine through one or more engine access points (EAPs) located at various stages of the pipeline. For example, an EAP can be used to send a request on behalf of a packet to a packet-processing engine, and to receive a corresponding response which can be integrated into the packet.

An engine is typically accessed by normal "traffic packets" to perform table lookups. In contrast, the engine is less frequently accessed by control-message (CM) packets to perform more time-consuming table-management operations. In order to maximize pipeline throughput, it is desirable to allow traffic packets to use as much of the engine's capacity as possible. Also, because CM packets are comparatively rare, it is undesirable to reserve engine capacity just to service these packets. In normal situations, traffic packets only achieve a 100% load for short periods of time. In other words, there are commonly gaps (unused capacity) in a stream of traffic packets. Hence, it is desirable for the engine to use these gaps to process requests for CM packets. However, using these gaps for CM packets involves performing queuing operations, and because queues are bounded in size it is important to ensure that no traffic packets or CM packets will be dropped because of queue overflow conditions.

However, it is complicated to ensure against queue overflow conditions because the mix between traffic packets and CM packets is typically controlled by an arbiter at the entrance to the programmable pipeline. Once a packet enters the pipeline, the packet proceeds through all of the pipeline stages without stalling. The engine has no other connection to the arbiter. (Note that because of the high pipeline speeds and the relatively large propagation delay between the engine and the arbiter, it is impractical to send feedback signals from the engine to the arbiter.)

A technique disclosed in U.S. patent application Ser. No. 11/722,470 (entitled "Method for Reducing Buffer Capacity in a Pipeline Processor," by the same inventors as the instant application, filed 28 Nov. 2007) ensures against queue overflow by letting one or more CM packets borrow engine capacity from the traffic packets, wherein the gaps in the traffic packets are used to regain the borrowed costs. Note that this borrowed engine capacity manifests itself as queue buildup, and this buildup needs to return to a low level, before new CM packets can be sent.

The above-described technique assumes that the location in the pipeline where you regain capacity (from gaps) is also the same location where you use the capacity (to service requests for traffic packets and CM packets). However, in many situations it is desirable for CM packets to use different engine access points (EAPs) from traffic packets. In this case, engine capacity is regained at different pipeline locations than where the capacity is used and the above-described technique may not operate properly.

Hence, what is needed is a method and an apparatus for scheduling packets to enter a programmable pipeline which operates in situations where CM packets and traffic packets access an engine from different pipeline locations.

SUMMARY

The disclosed embodiments relate to a packet-processing system. This system includes an input which is configured to receive packets, wherein the packets include control-message (CM) packets and traffic packets. It also includes a pipeline to process the packets, wherein the pipeline includes access points for accessing an engine which services requests for packets, wherein CM packets and traffic packets access the engine through different access points. The system additionally includes an arbiter to schedule packets entering the pipeline. While scheduling the packets, the arbiter is configured to account for empty slots in the pipeline to ensure that when CM packets and traffic packets initiate accesses to the engine through different access points, the accesses do not cause an overflow at an input queue for the engine.

In some embodiments, while scheduling the packets, the arbiter is configured to: initialize a resource shaper variable (RS) to zero; increment RS for each time interval; subtract a traffic-packet cost $C_T$ from RS for each traffic packet; subtract a CM-packet cost $C_{CM}$ from RS for each CM packet; and determine whether a CM packet can enter the pipeline based on the value of RS and an associated timer T.

In some embodiments, if an access point $A_{CM}$ for CM packets precedes an access point $A_T$ for traffic packets in the pipeline, the arbiter is configured to: (1) allow a previous CM packet which addresses the engine through $A_{CM}$ to enter the pipeline; (2) receive a next CM packet which also addresses the engine through $A_{CM}$; and (3) when RS reaches zero, start timer T, wherein T counts down a number of pipeline stages between $A_{CM}$ and $A_T$, and if T reaches 0 and if RS=0, allow the next CM packet to enter the pipeline. (The phrase "T counts down a number of pipeline stages" as used this specification and appended claims refers to a situation where T counts down for an amount of time corresponding to the number of pipeline stages. Note that the actual count can differ from the number of stages, for example if the timer operates with a clock frequency that differs from the clock frequency of the programmable pipeline.)

In some embodiments, if an access point $A_{CM}$ for CM packets follows an access point $A_T$ for traffic packets in the pipeline, the arbiter is configured to: (1) allow a previous CM packet which addresses the engine through $A_{CM}$ to enter the pipeline; (2) receive a next CM packet which also addresses the engine through $A_{CM}$; and (3) when RS reaches zero, allow the next CM packet to enter the pipeline; start timer T, wherein T counts down a number of pipeline stages between $A_T$ and $A_{CM}$; while T is running, freeze the value of RS so that RS does not change; and when T reaches zero, unfreeze the value of RS.

In some embodiments, the engine is configured to perform one or more of the following: a read operation into a lookup table; a write operation into a lookup table; a TCAM engine search; and a checksum computation.

In some embodiments, each access point in the pipeline is associated with a delay buffer of fixed length.

In some embodiments, the pipeline is configured to process packets continuously without stalling.

In some embodiments, the system also includes: one or more line interfaces; one or more system interfaces that support an optional connection to a switching core; and one or more packet buffers to facilitate internal switching within the packet-processing system.

In some embodiments, the pipeline can execute an ingress program for each ingress packet, and can execute an egress program for each egress packet. (Note that there can exist additional programs, for example "extended processing programs" which are executed for selected packets that re-circulate through the programmable pipeline.)

In some embodiments, the CM packets access the engine through one or more CM access points $A_{CMi}$, and the traffic packets access the engine through one or more traffic access points $A_{Ti}$, wherein the CM access points $A_{CMi}$ are different from the traffic access points $A_{Ti}$.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Network Switch

Figure 1:
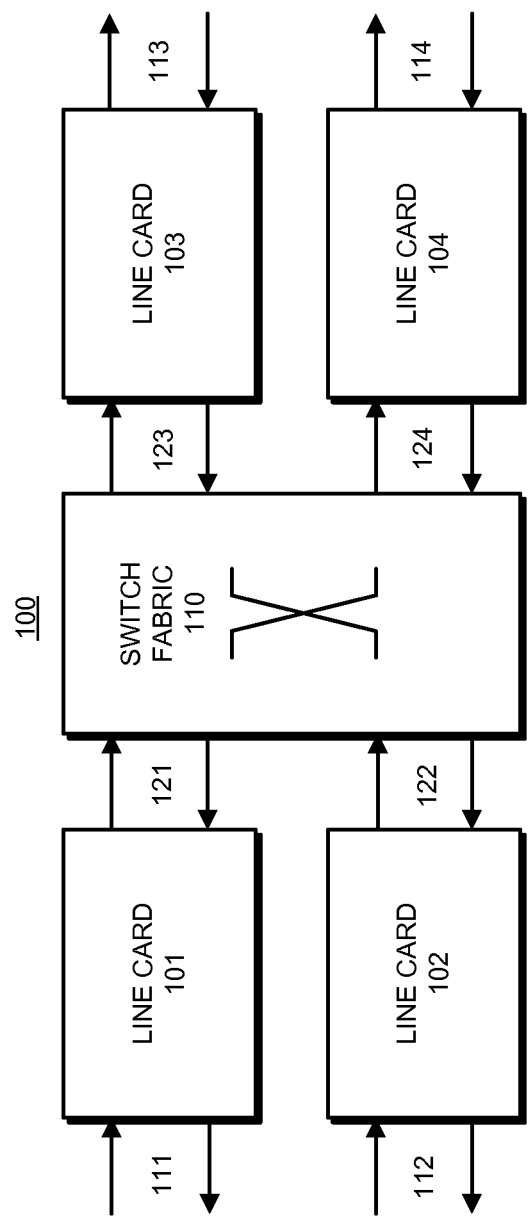
FIG. 1 illustrates a network router or switch in accordance with the disclosed embodiments.

FIG. 1 illustrates the structure of network router (or network switch) 100 in accordance with the disclosed embodiments. Network router/switch 100 includes a switch fabric 110, which is coupled to a number of line cards 101-104, through associated line card "system interfaces" 121-124. These line cards 101-104 are coupled to various communication lines (e.g., fiber optic links) through associated line card "line interfaces" 111-114.

Figure 2:
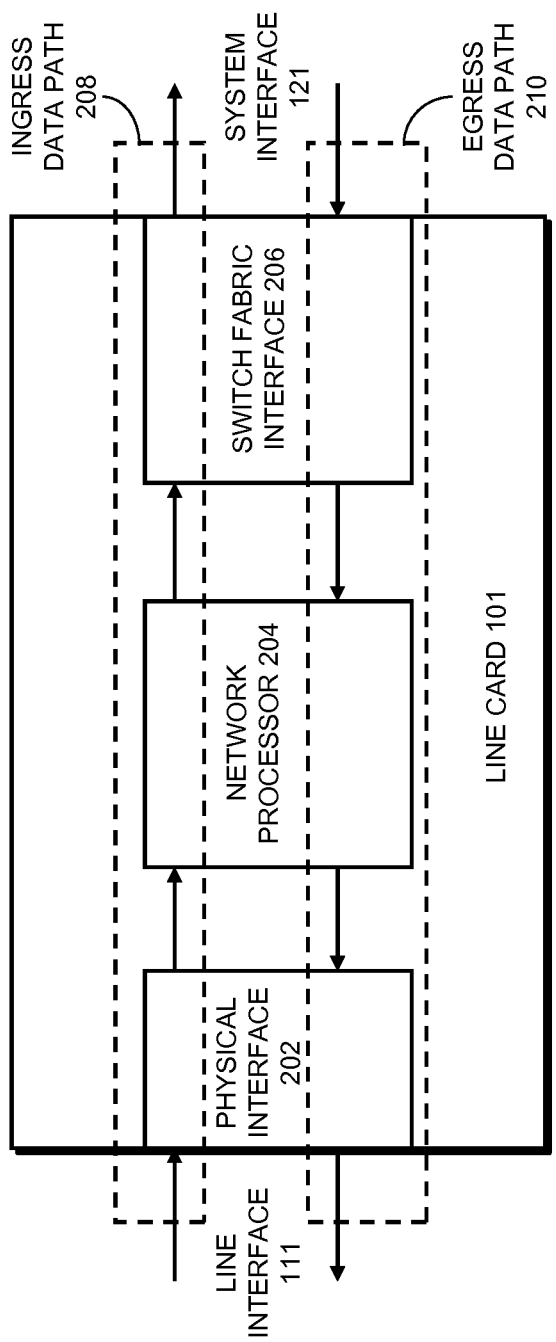
FIG. 2 illustrates a line card in accordance with the disclosed embodiments.

Referring to FIG. 2, line card 101 includes a physical interface 202 that contains circuitry to facilitate communications through line interface 111. Line card 101 also includes a switch fabric interface 206 that contains circuitry to facilitate communications through system interface 121. Physical interface 202 and switch fabric interface 206 are coupled to a network processor 204, which performs various packet-processing operations.

Note that line card 101 provides an "ingress data path" 208 for packets, which flows from line interface 111 through physical interface 202 and network processor 204, and then through switch fabric interface 206 and system interface 121 into switch fabric 110 (see FIG. 1). A corresponding "egress data path" 210 flows in the opposite direction from switch fabric 110 through system interface 121, then through switch fabric interface 206 and network processor 204, and then through physical interface 202 and line interface 111 to an associated communication channel.

Figure 3:
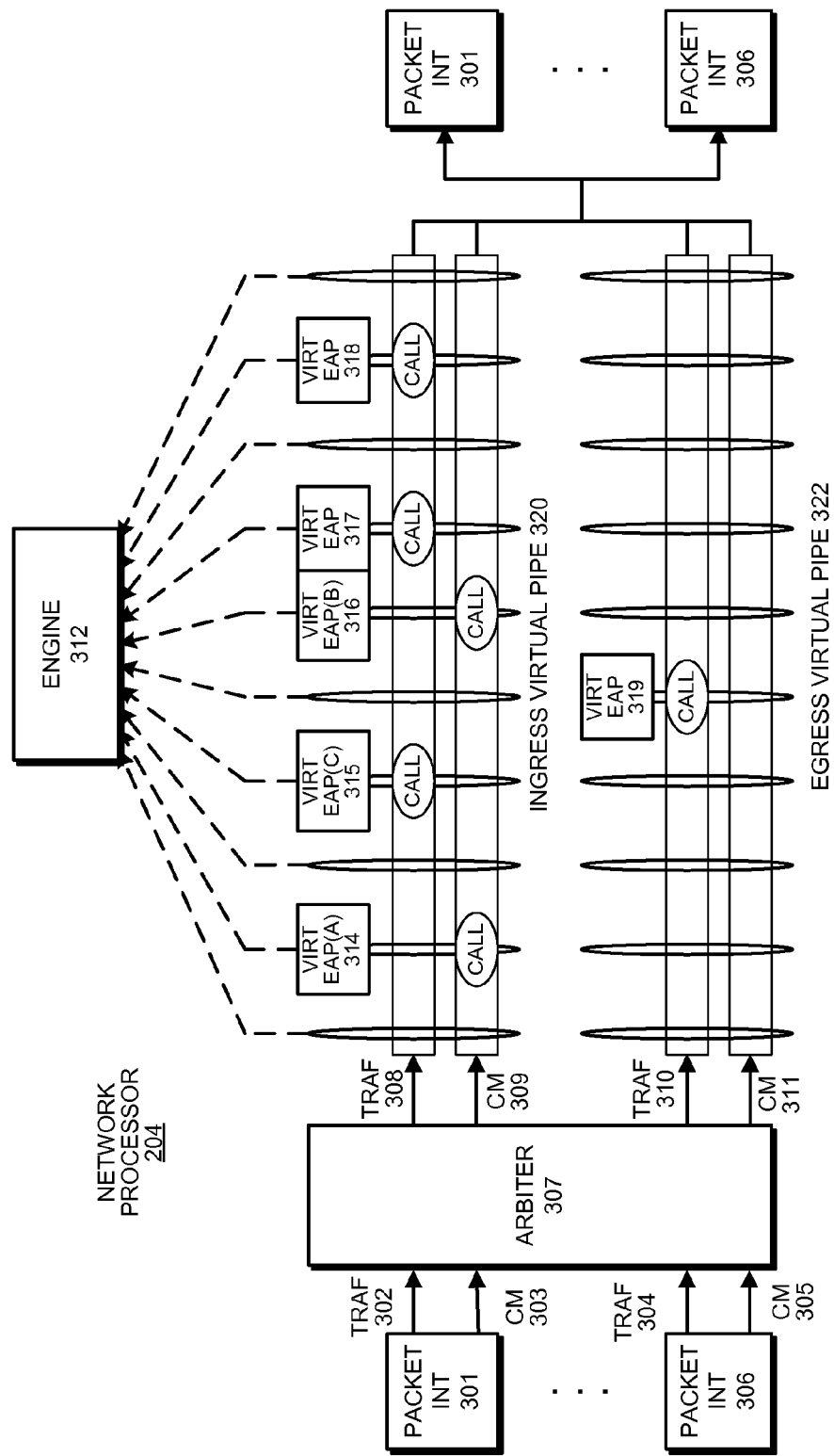
FIG. 3 illustrates a network processor in accordance with the disclosed embodiments.

FIG. 3 illustrates the internal structure of a network processor 204 in accordance with the disclosed embodiments. Network processor 204 includes a number of packet interfaces 301-306, which send and receive packets to physical interface 202 and switch fabric interface 206 in FIG. 2. (Although only two packet interfaces are shown, there can generally exist a larger number of packet interfaces.) Referring to the left-hand side of FIG. 3, traffic packets and CM packets from packet interfaces 301-306 feed into arbiter 307. More specifically, a stream of traffic packets 302 and a stream of CM packets 303 from packet interface 301 feed into arbiter 307. At the same time, a stream of traffic packets 304 and a stream of CM packets 305 from packet interface 306 feed into arbiter 307.

Arbiter 307 schedules these traffic and CM packets to produce a stream of traffic packets 308 and a stream of CM packets 309 for an ingress virtual pipeline 320, and also to produce a stream of traffic packets 310 and a stream of CM packets for an egress virtual pipeline 322. Note that ingress virtual pipeline 320 and egress virtual pipeline 322 actually flow through the same underlying physical pipeline (not shown). Also note that packets from the end of ingress virtual pipeline 320 and the end of egress virtual pipeline 322 flow back to packet interfaces 301-306.

The ingress virtual pipeline 320 and egress virtual pipeline 322 include a number of virtual engine access points (EAPs), which as mentioned above are specialized pipeline stages that facilitate sending a request on behalf of a packet to a packet-processing engine, and receiving a corresponding response. These virtual EAPs are represented by thin ovals in FIG. 3. Note that these virtual EAPs are associated with underlying physical EAPs, which are not shown. Also note that each EAP includes a fixed size delay buffer, which can be thought of as a shift register or a FIFO queue of fixed size.

The virtual EAPs access a shared engine 312 that can perform various packet-processing operations, such as accessing a lookup table. Engine 312 also includes a queue (not shown) for storing requests which are waiting to be processed by shared engine 312. (Note that there can exist multiple shared engines 312, each protected by a dedicated separate instance of a resource shaper.)

In the embodiment illustrated in FIG. 3, traffic packets make calls (requests) through different virtual EAPs than CM packets. More specifically, traffic packets make calls through virtual EAPs 315, 317 and 318 in ingress virtual pipeline 320 and virtual EAP 319 in egress virtual pipeline 322, whereas CM packets make calls through virtual EAPs 314 and 316 in ingress virtual pipeline 320.

Scheduling Packets

To reserve engine capacity for CM packets, older systems periodically send a non-executed control message (XCM) into the pipeline. An XCM passes through the pipeline and uses the same EAP as the traffic packets but does not execute any code. This ensures that a gap in traffic will periodically pass through the EAP, which provides additional time for the engine to process a preceding request from a CM packet.

Instead of sending XCMs, newer systems send CM packets containing programs, which can possibly send multiple read and write requests to an engine. In this case it is not possible to ensure that a CM packet will always use the same EAP as normal traffic packets. For example, referring to FIG. 3, in older systems, CM packets and traffic packets make calls through the same virtual EAP 315 (C). In this way, the system knows that when a gap in traffic passes through C, the queue at engine 312 will tend to decrease.

In newer systems, a CM packet contains a program which performs management operations, and this program does not call engine 312 through C. The program instead calls engine 312 from virtual EAP 314 (A) or virtual EAP 316 (B). However, there are time differences between A, B and C. Hence, if the program makes a call through A, the system cannot know if a gap in traffic that precedes the CM packet has reached C when the CM packet makes a call through A. On the other hand, if the program in the CM packet makes a call through B, a false gap may occur, wherein a gap in traffic that follows the CM packet may have already passed C when the CM packet makes a call through B.

This problem can be solved by using a timer in addition to the resource shaper (token bucket) described in U.S. patent Ser. No. 11/722,470 (cited above). This timer operates in two modes. In the case where the CM packet makes a call through A, the resource shaper counts to zero and then starts the timer to account for the difference in time between A and C. When this timer reaches zero and the resource shaper is zero, the system can let the CM packet into the pipeline. Note that when the resource shaper reaches zero, the system knows that enough gaps have passed through the pipeline interface to allow the engine to process the call through A. The system then starts the timer to account for the time difference between A and C. This ensures that all the gaps have reached C before the call is made through A.

For the case where the CM packet makes a call through B, the idea is to not count false gaps. This is accomplished as follows. When the resource shaper counts to zero, the system sends the CM packet and starts the timer, which counts down the difference in time between B and C. The system also freezes the resource shaper while this timer is running and does not unfreeze the resource shaper until the timer reaches zero. By freezing the resource shaper for the duration of the timer, the system does not count false gaps in the pipeline between B and C.

Figure 4:
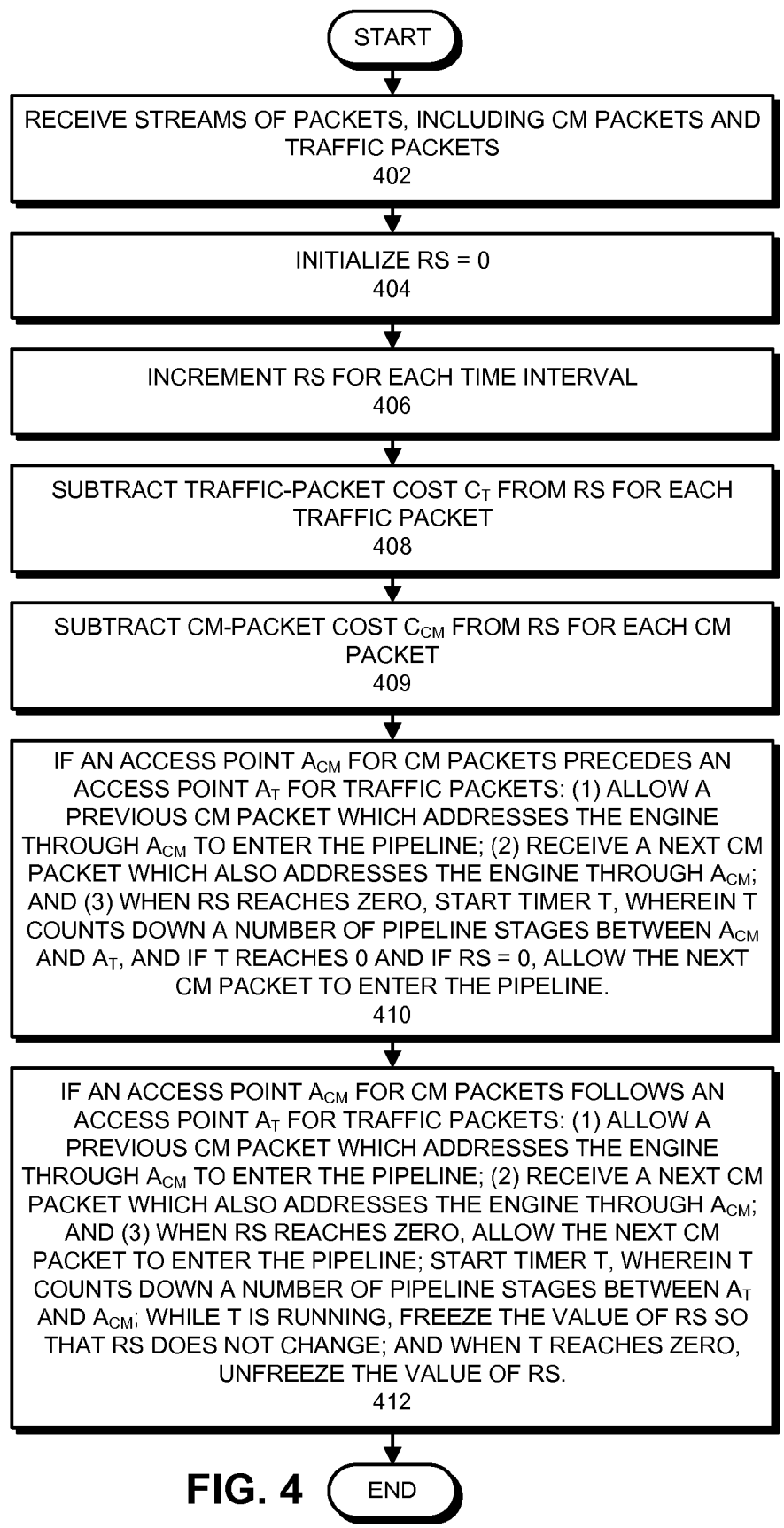
FIG. 4 presents a flow chart illustrating a process for scheduling CM packets in accordance with the disclosed embodiments.

The above-described scheduling process is described in more detail below with reference to the flow chart in FIG. 4. At the start of the process, the system (arbiter) receives one or more streams of packets including traffic packets and CM packets (step 402). Next, the system initializes the resource shaper variable (RS) to zero (step 404). During operation, the system then increments RS for each time interval (406). The system also subtracts a traffic-packet cost $C_T$ from RS for each traffic packet (step 408) and subtracts a CM-packet cost $C_{CM}$ from RS for each CM packet (step 409).

The system also determines whether a CM packet can enter the pipeline based on the value of RS and an associated timer T. In the case where an access point $A_{CM}$ for CM packets precedes an access point $A_T$ for traffic packets in the pipeline, the system: (1) allows a previous CM packet which addresses the engine through $A_{CM}$ to enter the pipeline; (2) receives a next CM packet which also addresses the engine through $A_{CM}$; and (3) when RS reaches zero, starts timer T, wherein T counts down a number of pipeline stages between $A_{CM}$ and $A_T$, and if T reaches 0 and if RS=0, allows the next CM packet to enter the pipeline (step 410).

In the case where the access point $A_{CM}$ for CM packets follows the access point $A_T$ for traffic packets in the pipeline, the system: (1) allows a previous CM packet which addresses the engine through $A_{CM}$ to enter the pipeline; (2) receives a next CM packet which also addresses the engine through $A_{CM}$; and (3) when RS reaches zero, allows the next CM packet to enter the pipeline; start timer T, wherein T counts down a number of pipeline stages between $A_T$ and $A_{CM}$; while T is running, freezes the value of RS so that RS does not change; and when T reaches zero, unfreezes the value of RS (step 412).

For example, assume that a traffic packet costs 5 cycles and a CM packet costs 50 cycles. In each clock cycle, the system increases RS by one, so every five clock cycles a traffic packet is sent and RS reaches zero again. When RS reaches zero, the system can send another CM packet. (In the case where the EAP for CM packets precedes the EAP for traffic packets, when RS reaches zero, the system starts the timer and waits until the timer counts down to zero before sending the CM packet.) After the CM packet is sent, RS will hover between −50 and −45. (In the case where the EAP for CM packets follows the EAP for traffic packets, when RS reaches zero, the system sends the CM packet, starts the timer and waits until the timer counts down to zero. While the counter is active, the system freezes the value of RS.) Next, when there is a gap in traffic, RS increases until RS eventually reaches zero again. At this point, the system knows that the queue at the engine is empty, and the system can start processing another CM packet.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:
1. A packet-processing system, comprising:
an input configured to receive packets, wherein the packets include control-message (CM) packets and traffic packets;

a pipeline configured to process the packets, wherein the pipeline includes access points for accessing an engine which services requests for packets, and wherein CM packets and traffic packets access the engine through different access points; and an arbiter configured to schedule packets entering the pipeline;

wherein while scheduling the packets, the arbiter is configured to account for empty slots in the pipeline to ensure that when CM packets and traffic packets initiate accesses to the engine through different access points the accesses do not cause an overflow at an input queue for the engine.

2. The packet-processing system of claim 1, wherein while scheduling the packets, the arbiter is configured to:
  initialize a resource shaper variable (RS) to zero;
  increment RS for each time interval;
  subtract a traffic-packet cost $C_T$ from RS for each traffic packet;
  subtract a CM-packet cost $C_{CM}$ from RS for each CM packet; and
  determine whether a CM packet can enter the pipeline based on the value of RS and an associated timer T.

3. The packet-processing system of claim 2, wherein if an access point $A_{CM}$ for CM packets precedes an access point $A_T$ for traffic packets in the pipeline, the arbiter is configured to:
  allow a previous CM packet which addresses the engine through $A_{CM}$ to enter the pipeline;
  receive a next CM packet which also addresses the engine through $A_{CM}$; and
  when RS reaches zero,
    start timer T, wherein T counts down a number of pipeline stages between $A_{CM}$ and $A_T$; and
    if T reaches 0 and if RS=0, allow the next CM packet to enter the pipeline.

4. The packet-processing system of claim 2, wherein if an access point $A_{CM}$ for CM packets follows an access point $A_T$ for traffic packets in the pipeline, the arbiter is configured to:
  allow a previous CM packet which addresses the engine through $A_{CM}$ to enter the pipeline;
  receive a next CM packet which also addresses the engine through $A_{CM}$; and
  when RS reaches zero,
    allow the next CM packet to enter the pipeline;
    start timer T, wherein T counts down a number of pipeline stages between $A_T$ and $A_{CM}$;
    while T is running, freeze the value of RS so that RS does not change; and
    when T reaches zero, unfreeze the value of RS.

5. The packet-processing system of claim 1, wherein the engine is configured to perform one or more of the following:
  a read operation into a lookup table;
  a write operation into a lookup table;
  a TCAM engine search; and
  a checksum computation.

6. The packet-processing system of claim 1, wherein each access point in the pipeline is associated with a delay buffer of fixed length.

7. The packet-processing system of claim 1, wherein the pipeline is configured to process packets continuously without stalling.

8. The packet-processing system of claim 1, further comprising:
  one or more line interfaces;
  one or more system interfaces that support an optional connection to a switching core; and
  one or more packet buffers to facilitate internal switching within the packet-processing system.

9. The packet-processing system of claim 8,
  wherein the pipeline can execute an ingress program for each ingress packet; and
  wherein the pipeline can execute an egress program for each egress packet.

10. The packet-processing system of claim 1,
  wherein the CM packets access the engine through one or more CM access points $A_{CMi}$;
  wherein the traffic packets access the engine through one or more traffic access points $A_{Ti}$; and
  wherein the CM access points $A_{CMi}$ are different from the traffic access points $A_{Ti}$.

11. A method for operating a packet-processing system, comprising:
  receiving a stream of packets, wherein the packets include control-message (CM) packets and traffic packets; and
  directing packets from the stream into a pipeline that processes packets, wherein the pipeline includes access points for accessing an engine which services requests for packets, and wherein CM packets and traffic packets access the engine through different access points;
  wherein directing the packets into the pipeline involves scheduling the packets to account for empty slots in the pipeline to ensure that when CM packets and traffic packets initiate accesses to the engine through different access points the accesses do not cause an overflow at an input queue for the engine.

12. The method of claim 11, wherein scheduling the packets involves:
  initializing a resource shaper variable (RS) to zero;
  incrementing RS for each time interval;
  subtracting a traffic-packet cost $C_T$ from RS for each traffic packet;
  subtracting a CM-packet cost $C_{CM}$ from RS for each CM packet; and
  determining whether a CM packet can enter the pipeline based on the value of RS and an associated timer T.

13. The method of claim 12, wherein if an access point $A_{CM}$ for CM packets precedes an access point $A_T$ for traffic packets in the pipeline, scheduling the packets involves:
  allowing a previous CM packet which addresses the engine through $A_{CM}$ to enter the pipeline;
  receiving a next CM packet which also addresses the engine through $A_{CM}$; and
  after RS reaches zero,
    starting timer T, wherein T counts down a number of pipeline stages between $A_{CM}$ and $A_T$, and
    if T reaches 0 and if RS=0, allowing the next CM packet to enter the pipeline.

14. The method of claim 12, wherein if an access point $A_{CM}$ for CM packets follows an access point $A_T$ for traffic packets in the pipeline, scheduling the packets involves:
  allowing a previous CM packet which addresses the engine through $A_{CM}$ to enter the pipeline;
  receiving a next CM packet which also addresses the engine through $A_{CM}$; and
  after RS reaches zero,
    allowing a CM packet to enter the pipeline;
    starting timer T, wherein T counts down a number of pipeline stages between $A_T$ and $A_{CM}$;
    while T is running, freezing the value of RS so that RS does not change; and
    when T reaches zero, unfreezing the value of RS.

15. The method of claim 11, wherein the engine is configured to perform one or more of the following:

a read operation into a lookup table;
a write operation into a lookup table;
a TCAM engine search; and
a checksum computation.

16. The method of claim 11, wherein each access point in the pipeline is associated with a delay buffer of fixed length.

17. The method of claim 11, wherein the pipeline is configured to process packets continuously without stalling.

18. The method of claim 11, wherein the packet-processing system further comprises:
one or more line interfaces;
one or more system interfaces that support an optional connection to a switching core; and
one or more packet buffers to facilitate internal switching within the packet-processing system.

19. The method of claim 18,
wherein the pipeline can execute an ingress program for each ingress packet; and
wherein the pipeline can execute an egress program for each egress packet.

20. The method of claim 11,
wherein the CM packets access the engine through one or more CM access points $A_{CMi}$;
wherein the traffic packets access the engine through one or more traffic access points $A_{Ti}$; and
wherein the CM access points $A_{CMi}$ are different from the traffic access points $A_{Ti}$.

21. A packet-processing system, comprising:
one or more line interfaces;
a switching core;
a pipeline configured to process packets received from the one or more line interfaces to be sent to the switching core, and packets received from the switching core to be sent to the one or more line interfaces;
wherein the packets include control-message (CM) packets and traffic packets; and
wherein the pipeline includes access points for accessing an engine which services requests for packets, wherein CM packets and traffic packets access the engine through different access points; and
an arbiter configured to schedule packets entering the pipeline, wherein while scheduling the packets, the arbiter is configured to account for empty slots in the pipeline to ensure that when CM packets and traffic packets initiate accesses to the engine through different access points the accesses do not cause an overflow at an input queue for the engine.

22. The packet-processing system of claim 21, wherein while scheduling the packets, the arbiter is configured to:
initialize a resource shaper variable (RS) to zero;
increment RS for each time interval;
subtract a traffic-packet cost $C_T$ from RS for each traffic packet;
subtract a CM-packet cost $C_{CM}$ from RS for each CM packet; and
determine whether a CM packet can enter the pipeline based on the value of RS and an associated timer T.

23. The packet-processing system of claim 22, wherein if an access point $A_{CM}$ for CM packets precedes an access point $A_T$ for traffic packets in the pipeline, the arbiter is configured to:
allow a previous CM packet which addresses the engine through $A_{CM}$ to enter the pipeline;
receive a next CM packet which also addresses the engine through $A_{CM}$; and
when RS reaches zero,
start timer T, wherein T counts down a number of pipeline stages between $A_{CM}$ and $A_T$; and
if T reaches 0 and if RS=0, allow the next CM packet to enter the pipeline.

24. The packet-processing system of claim 22, wherein if an access point $A_{CM}$ for CM packets follows an access point $A_T$ for traffic packets in the pipeline, the arbiter is configured to:
allow a previous CM packet which addresses the engine through $A_{CM}$ to enter the pipeline;
receive a next CM packet which also addresses the engine through $A_{CM}$; and
when RS reaches zero,
allow the next CM packet to enter the pipeline;
start timer T, wherein T counts down a number of pipeline stages between $A_T$ and $A_{CM}$;
while T is running, freeze the value of RS so that RS does not change; and
when T reaches zero, unfreeze the value of RS.

* * * * *